US006700066B1

(12) United States Patent
Kuo et al.

(10) Patent No.: US 6,700,066 B1
(45) Date of Patent: Mar. 2, 2004

(54) CABLE CONNECTOR ASSEMBLY AND METHOD OF MANUFACTURING THE CABLE CONNECTOR ASSEMBLY

(75) Inventors: Chin Pao Kuo, Tu-Chen (TW); Shih Tung Chang, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/324,331

(22) Filed: Dec. 18, 2002

(30) Foreign Application Priority Data

Nov. 29, 2002 (TW) .......................................... 91134727

(51) Int. Cl.[7] .......................... H02G 15/02; H01R 9/05; H01R 13/02

(52) U.S. Cl. ....................... 174/74 R; 174/78; 439/578; 439/885

(58) Field of Search ............................ 174/74 R, 75 C, 174/78, 84 R, 84 C, 88 R, 88 C, 89; 439/578, 579, 585, 885

(56) References Cited

U.S. PATENT DOCUMENTS

| | | | | | |
|---|---|---|---|---|---|
| 3,728,787 | A | * | 4/1973 | McDonough | 29/877 |
| 4,269,469 | A | * | 5/1981 | Audic | 439/424 |
| 5,073,128 | A | * | 12/1991 | Sirai et al. | 439/585 |
| 5,078,619 | A | * | 1/1992 | Whittle et al. | 439/578 |
| 5,342,219 | A | * | 8/1994 | Onodera et al. | 439/595 |
| 5,415,568 | A | * | 5/1995 | Kinoshita | 439/610 |
| 5,484,961 | A | | 1/1996 | Itoh et al. | |
| 5,603,636 | A | * | 2/1997 | Kanou et al. | 439/585 |
| 5,749,752 | A | * | 5/1998 | Kashiyama et al. | 439/733.1 |
| 5,785,555 | A | * | 7/1998 | O'Sullivan et al. | 439/610 |
| 6,338,652 | B1 | * | 1/2002 | Ko | 439/579 |
| 2001/0049877 | A1 | * | 12/2001 | Sato et al. | 29/860 |

FOREIGN PATENT DOCUMENTS

| | | | | | |
|---|---|---|---|---|---|
| JP | 06-208858 A | * | 7/1994 | | H01R/9/05 |
| JP | WO 98/00890 A | * | 1/1998 | | H01R/13/658 |

* cited by examiner

*Primary Examiner*—William H. Mayo, III
(74) *Attorney, Agent, or Firm*—Wei Te Chung

(57) ABSTRACT

A cable connector assembly has a number of coaxial cables (10) and a number of contacts (20). Each coaxial cable has a center conductor (61), an insulated layer (62) enclosing the center conductor, and a metal braiding (64) covering the insulated layer. Each contact has a pair of first, second claws (21, 22) at a rear end thereof. Each contact electrically connects with a corresponding coaxial cable with the pair of first claws mechanically crimping to the center conductor for providing a signal transmission between the center conductor and the contact, and the pair of second claws mechanically crimping and engaging with the insulated layer for providing a reliable retention between the contact and the coaxial cable.

14 Claims, 5 Drawing Sheets

CABLE CONNECTOR ASSEMBLY AND METHOD OF MANUFACTURING THE CABLE CONNECTOR ASSEMBLY

BACKGROUND OF THE INVENTION

1. Field of the Invention

The present invention relates to a cable connector assembly and a method of manufacturing the cable connector assembly, particularly to a cable connector assembly having a plurality of contacts each electrically connecting with an improved coaxial cable and an improved terminating method used to connect the coaxial cable with the contacts.

2. Description of Related Art

A cable connector assembly includes an electrical connector and a plurality of cables connected with the electrical connector. The electrical connector generally includes a crimping type of contact crimping one end of a cable for providing electrical transmission therebetween which has been conventionally known. Such a crimping type of terminating method is widely used in the art because of its convenience, high speed transmission, and lowest cost.

U.S. Pat. No. 5,484,961 discloses a terminal crimping method basically comprising the steps of: (a) assembling an electric cable W in one end of a crimping terminal A; (b) holding a claw A3 of the crimping terminal A; (c) enclosing an insulated layer W2 of the electric cable W; (d) crimping a claw A1 of the crimping terminal A to a conductor W1 for providing an electrical transmission. The cable connector assembly is thus formed. However, such cable connector assembly generally adopts an ordinary discrete cable which has no shielding layer and noise is increased during signal transmission, especially including electromagnetic interface (EMI) between two neighboring cables.

To solve the problems stated above, the conventional cable connector assembly further comprises a shielding fabricated from metal or other conductive materials enclosing a housing for eliminating problems resulting from EMI. However, the shielding can not prevent noise from interfering the neighboring cables. It is desired to provide a new and an improved cable used in the cable connector assembly to overcome the disadvantages of the related art.

Furthermore, a center conductor of the cable may have a small dimension in a small size cable connector assembly. The retention force between the center conductor of the cable and a corresponding crimping contact with a claw portion thereof is not reliable. The electrical transmission is affected. Correspondingly, the present problem that person in the art confronts is that an improved crimping termination method is required for providing a reliable structural connection.

SUMMARY OF THE INVENTION

Accordingly, a first object of the present invention is to provide a cable connector assembly that noise between two neighboring coaxial cables can be effectively reduced and suppressed.

A second object of the present invention is to provide a method for terminating a plurality of coaxial cables to corresponding contacts.

In order to achieve the objects set forth, a cable connector assembly in accordance with the present invention comprises a plurality of cables and contacts. Each cable has a center conductor, an insulated layer, a metal braiding, and a coating layer. The center conductor, the insulated layer and the metal braiding are ordinally and partially exposed at a tip part of the cable. Each contact has a pair of first claws and a pair of second claws. Each contact electrically connects with a corresponding cable with the pair of first claws crimping the center conductor of the cable for providing signal transmission and the pair of second claws engaging with the insulated layer thereof for providing a reliable retention therebetween.

Furthermore, a method of manufacturing the cable connector assembly comprises the steps of: (a') preparing a metal strip, the metal strip comprising a plurality of contacts and a carrier connecting with front ends of the contacts, each contact having a pair of first claws and a pair of second claws; (b') providing a plurality of coaxial cables, each coaxial cable comprising a center conductor, an insulated layer, a metal braiding, and a coating layer, the center conductor, the insulated layer and the metal braiding partially and ordinally exposed at the tip part of the coaxial cable; (c') assembling the coaxial cables to the contacts with each center conductor received in the pair of first claws of the contact, the insulated layer received in the pair of second claws; (d') soldering the center conductor of the coaxial cable to the contact, crimping the pair of first claws of the contact to the center conductor of the coaxial cable for providing a signal transmission, and crimping the pair of second claws to the insulated layer of the coaxial cable for holding the coaxial cable.

Other objects, advantages and novel features of the invention will become more apparent from the following detailed description when taken in conjunction with the accompanying drawings.

DETAILED DESCRIPTION OF THE INVENTION

Figure 1:
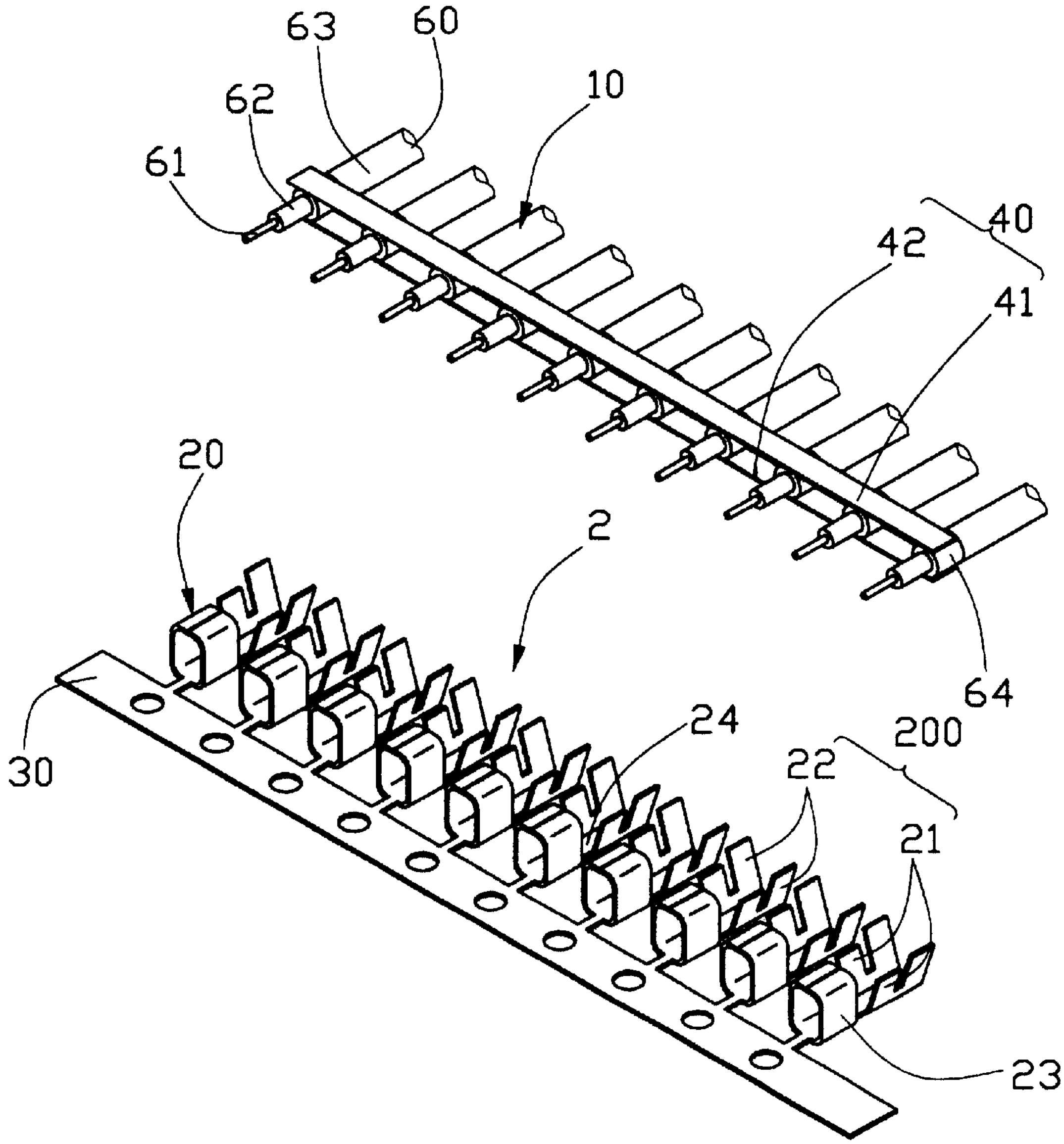
FIG. 1 is a partial, exploded, perspective view of a cable connector assembly in accordance with the present invention showing contacts thereof with a carrier and a grounding member soldered on coaxial cables.

Referring to FIGS. 1–4, a cable connector assembly 1 in accordance with the present invention includes a dielectric housing (not shown), a plurality of cables 10 arranged in a row, a plurality of contacts 20 each electrically connecting with a corresponding cable 10, and a grounding member 40.

The cables 10 are coaxial cables, for instance. Each cable 10 contains a center conductor 61, an insulated layer 62 enclosing the center conductor 61, a metal braiding 64 made of woven strands of a conductive metal and surrounding the insulated layer 62, and a coating layer 63 finally covering the metal braiding 64. The tip part of each cable 10 is stripped off the coating layer 63 so that the center conductor 61, the insulated layer 62, and the metal braiding 64 are ordinally and partially exposed along the front-to-rear direction. The cables 10 are electrically and mechanically connected to corresponding contacts 20 as described hereinafter.

The grounding member 40 is generally made of a conductive metal and has a top and a bottom grounding bars 41, 42 respectively covering the row of the cables 10. The top and bottom grounding bars 41, 42 are respectively soldered on corresponding exposed portions of the metal braiding 64 of the coaxial cables 10. The grounding member 40 is further electrically connected with an outer shielding (not shown) of the cable connector assembly 1 for providing grounding transmission.

A conductive metal sheet is stamped to form a metal strip 2. The metal strip 2 includes a plurality of contacts 20 arranged side by side and a carrier 30 connecting front ends of the contacts 20. Each contact 20 has a body 24, a mating portion 23 extending upwardly from lateral sides of a front end of the body 24 and bent to form a rectangular hollow frame adapted for mating with a corresponding contact of a complementary connector (not shown), and a retaining portion 200 for holding a corresponding cable 10. The retaining portion 200 of the contact 20 has a pair of first claws 21 integrally extending from a rear end of the mating portion 23 and a pair of second claws 22 at the rear end of the contact 20. The pair of first claws 21 engages with the center conductor 61 and the pair of second claws 22 engages with the insulated layer 62 of the cable 10 for providing a reliable retention and a detail description will be given hereinafter.

The dielectric housing molded of plastic or polymer material is provided to over-mold and enclose the contacts 20, the tip part of the cable 10 and the grounding member 40.

Figure 3:
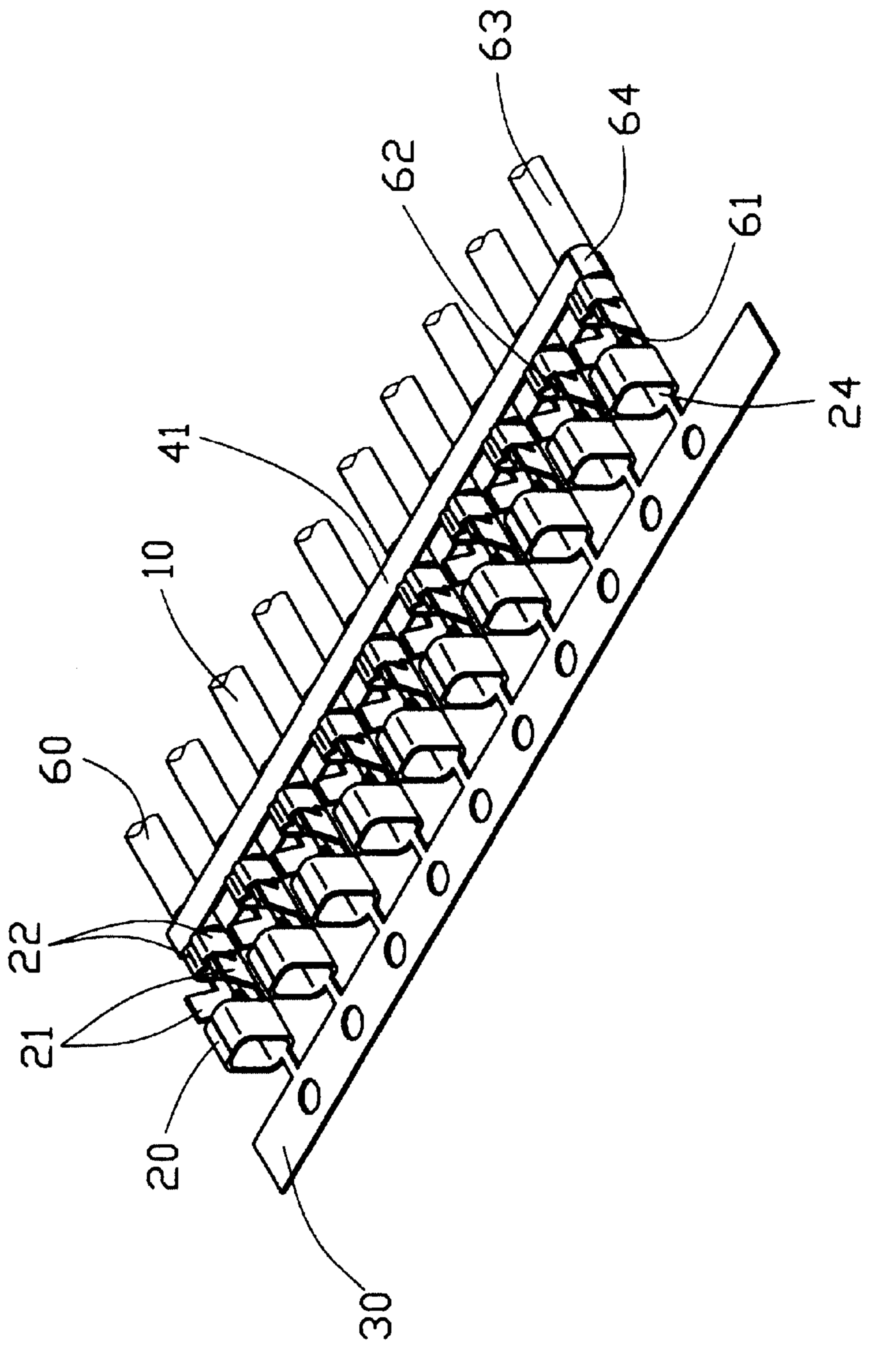
FIG. 3 is an assembled view of the cable connector assembly of FIG. 1 showing the second claws of the contacts holding corresponding insulated layers and center conductors soldered on the contacts.
Figure 4:
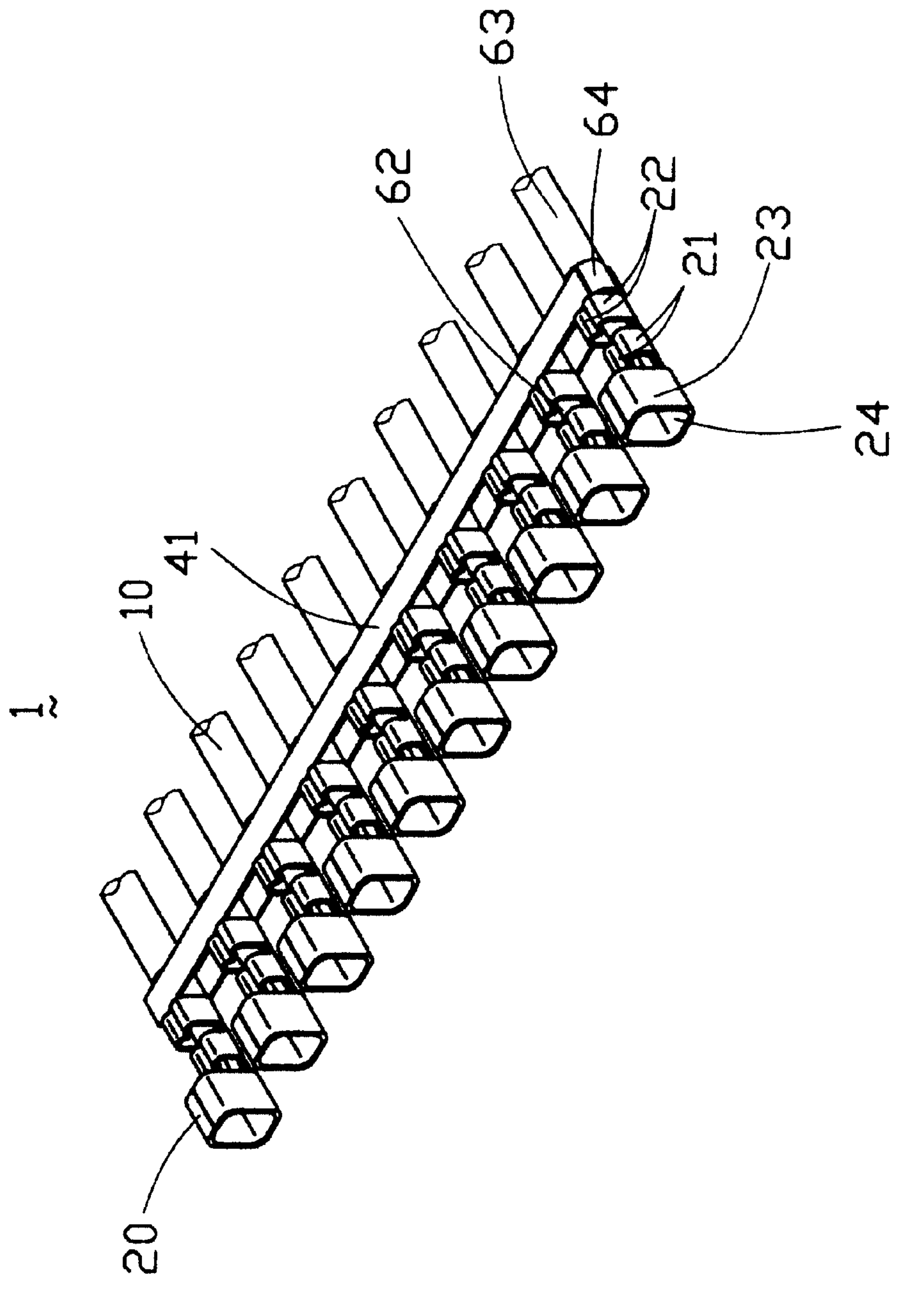
FIG. 4 is a partial, assembled, perspective view of the cable connector assembly of FIG. 1.
Figure 5:
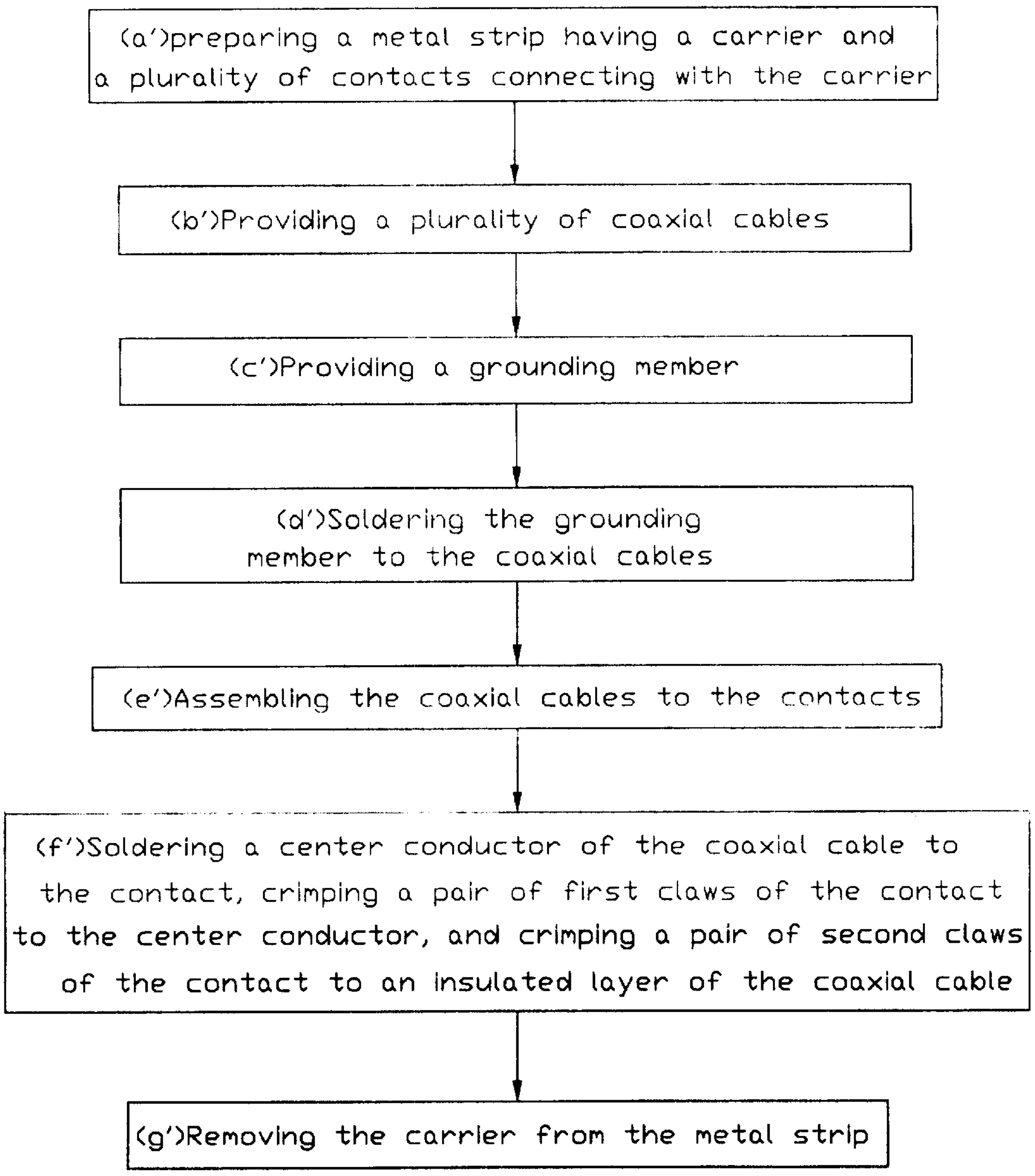
FIG. 5 is a flowing chart illustrating a method of manufacturing the cable connector assembly of FIG. 1.

Referring to FIG. 5 in conjunction with FIGS. 1–4, a method of terminating the cables 10 to corresponding contacts 20 of the cable connector assembly 1 of the present invention comprises following steps:

Step (a') is preparing a metal strip 2 from a metal sheet. The metal strip 2 includes a plurality of contacts 20 and a carrier 30 connecting front ends of the contacts 20, referring to FIG. 1.

Step (b') is providing a plurality of coaxial cables 10. The coaxial cables 10 are arranged in a row. The tip part of each cable 10 is stripped off the coating layer 63 so that the center conductor 61, the insulated layer 62, and the metal braiding 64 are ordinally and partially exposed.

Step (c') is providing a grounding member 40 made of conductive metal. The grounding member 40 has a top and a bottom grounding bars 41, 42, referring to FIG. 1.

Step (d') is soldering the grounding member 40 to the coaxial cables 10 with the top and the bottom grounding bars 41, 42 electrically connecting with the exposed portions of the metal braiding 64 of the coaxial cables 10, as shown in FIG. 1.

Figure 2:
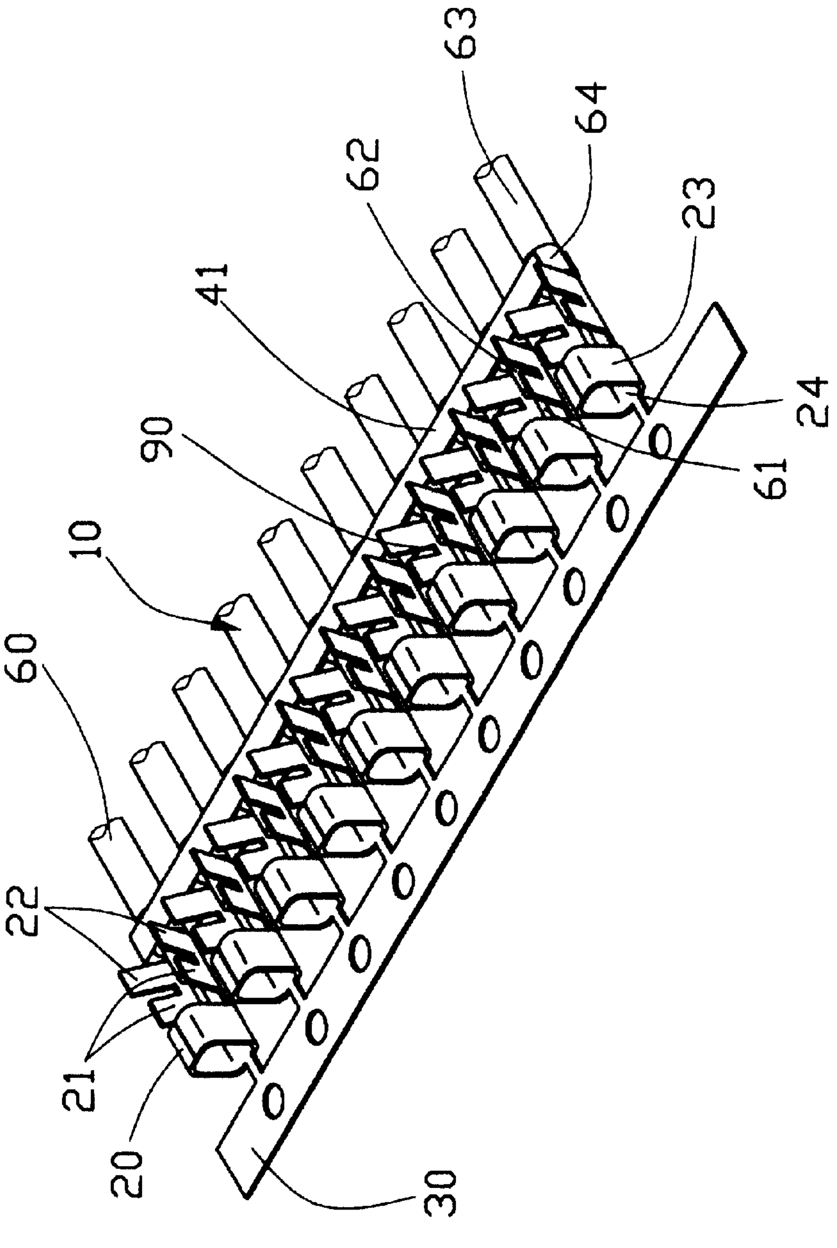
FIG. 2 is an assembled view of the cable connector assembly of FIG. 1 showing center conductors of the cables assembled in the contacts.

Step (e') is assembling the coaxial cables 10 to the contacts 20. Referring to FIG. 2, each center conductor 61 of the coaxial cable 10 is positioned on the body 24 and locating between the pair of first claws 21. Correspondingly, each insulated layer 62 locates between the pair of second claws 22, as shown in FIG. 2.

Step (f') is soldering the center conductor 61 of the coaxial cable 10 to the contact 20, crimping the pair of first claws 21 of each contact 20 to the center conductor 61, and crimping the pair of the second claws 22 to the insulted layer 62 of the coaxial cable 10. Referring to FIG. 3, the center conductor 61 of the coaxial cable 10 is soldered and crimped by the first claws 61 of the corresponding contact 20 for providing a signal transmission. Corresponding, referring to FIG. 4, the second claws 62 engages with the insulated layer 62 of corresponding coaxial cable 10 and the retention force therebetween is then enhanced.

Step (g') is removing the carrier 30 from the metal strip 2, as shown in FIG. 4.

It should be noted that the termination procedures of the coaxial cables 10 to the contacts 20 is illustratively described above. The coaxial cables 10, the contacts 20 and the grounding member 30 is later over-molded and enclosed by the dielectric housing and the cable connector assembly 1 is then formed which is known to persons skilled in the art and the detailed description thereof is omitted here.

As mentioned above, the advantages of the prevent invention is that a cable connector assembly 1 is provided with the coaxial cables 10 has the metal braiding 64 electrically connecting with the grounding member 40 for providing a grounding path. The cable connector assembly 1, therefore, can eliminate the noise, especially the noise from interfering between neighboring coaxial cables 10 and thus has an excellent shielding effect. Furthermore, each center conductor 61 of the coaxial cable 10 is prearranged to be soldered on a corresponding contact 20. The electrical and mechanical connection between the coaxial cables 10 and the contacts 20 is thus enforced. The signal transmission is thus reliably assured.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly for mating with a complementary connector, comprising: a plurality of coaxial cables each having a center conductor, an insulated layer enclosing the center conductor, and a metal braiding covering the insulated layer, the center conductor, and the insulated layer and the metal braiding partially and ordinarily exposed at a tip part of the coaxial cable; a plurality of contacts each having a mating portion at a front end thereof for connecting with a corresponding contact of the complementary connector, and a pair of first claws integrally extending from a rear end of the mating portion and mechanically crimping to a corresponding center conductor for providing a signal transmission between the center conductor and the contact, and a pair of second claws integrals formed at a rear end of the contact mechanically crimping and engaging with the insulated layer for providing a reliable retention between the contact and the coaxial cable; and a grounding member electrically connected with the metal braiding of the coaxial cable, wherein the grounding member has a pair of grounding bars, the plurality of coaxial cables are arranged in a row, and wherein the pair of grounding bars separately enclose upper and bottom surfaces of the row of the coaxial cables and are soldered on the metal braiding of the coaxial cables.

2. The cable connector assembly as claimed in claim 1, wherein each coaxial cable further comprises a coating layer surrounding the metal braiding, the metal braiding projecting outwardly and exposed at the tip part of the coating layer.

3. The cable connector assembly as claimed in claim 1, wherein each center conductor of the coaxial cable is prearranged to be soldered on a corresponding contact before the first claws are crimped to the center conductor.

4. A method for manufacturing a cable connector assembly, comprising the steps of (a') preparing a metal strip comprising a plurality of contacts and a carrier connecting front ends of the contacts, each contact having a pair of first claws and a pair of second claws;

(b') providing a plurality of coaxial cables arranged in a row, each coaxial cable comprising a center conductor, an insulated layer enclosing the center conductor, and a metal braiding covering the insulated layer, the center conductor, the insulated layer and the metal braiding partially and ordinarily exposed at a tip part of the coaxial cable;

(c') providing a grounding member and soldering the grounding member to the metal braiding of the coaxial cables;

(d') assembling the coaxial cables to corresponding contacts with each center conductor locating between the pair of first claws of the contact and each insulated layer of the coaxial cable locating between the pair of second claws;

(e') soldering the center conductors of the coaxial cables respectively to the contacts;

(f') crimping the pair of first claws of the contact to the center conductor of each coaxial cable so as to provide a signal transmission between the contact and the coaxial cable;

(g') crimping the pair of second claws of the contact to the insulated layer of the coaxial cable so as to hold the coaxial cable; between the contact and the coaxial cable, wherein the qrounding member comprises a pair of grounding bars enclosing upper and bottom surfaces of the coaxial cables and separately electrically connecting with the metal braidings of the coaxial cables.

5. The method for manufacturing a cable connector assembly as claimed in claim 4, wherein each coaxial cable further comprises a coating layer covering the metal braiding.

6. The method for manufacturing a cable connector assembly as claimed in claim 4, further comprising a step of removing the carrier of the contact carrier after crimping the first pair of claws and the second pair of claws of the contact to the coaxial cable.

7. A cable assembly comprising:

a plurality of coaxial cables side by side arranged with one another, each of said coaxial cables including at least a tiny inner conductor and an insulated layer enclosing said inner conductor, an exposed portion of the inner conductor being exposed in front of an exposed portion of said insulated layer, a braiding surrounding the insulated layer and having thereof a portion exposed behind the exposed portion of the insulated layer;

a plurality of contacts side by side arranged with one another corresponding to the coaxial cables, respectively, each of said contacts including a mating section in a front portion thereof adapted for coupling to an external conductor of a complementary connector, and a securing section in a rear portion thereof for securing to the corresponding coaxial cable; and a grounding member mechanically and electrically engaging with the braiding of each of said cables;

said securing section including at least a first set of crimping slaw claws transversely aligned with the exposed portion of the corresponding inner conductor, and a second set of crimping claws transversely aligned with the corresponding insulated layer; wherein the second set of crimping claws directly grips the corresponding insulated layer, while the inner conductor is not only gripped by the first set of crimping claw claws but also soldered on the securing section, wherein the grounding member has a pair of grounding bars, and wherein the pair of grounding bars separately enclose upper and bottom surfaces of the side by side coaxial cables and are soldered on the metal braiding of the coaxial cables.

8. The cable assembly as claimed in claim 7, wherein said contacts are linked by a carrier.

9. The cable assembly as claimed in claim 8, wherein said carrier interconnects the mating sections of the contacts.

10. The cable assembly as claimed in claim 7, wherein each of said cables further includes an outer braiding enclosing said insulated layer while exposing a front portion of said insulated layer where the second set of crimping claws is located.

11. The cable assembly as claimed in claim 7, wherein the braiding is soldered upon the grounding member.

12. The cable assembly as claimed in claim 7, wherein said grounding member is positioned adjacent to said second set of crimping claws.

13. The cable assembly as claimed in claim 7, wherein said inner conductor is first soldered on the securing section before gripped by said first set of crimping claws.

14. The cable assembly as claimed in claim 7, wherein said inner conductor is soldered on the first set of crimping claws.

* * * * *